(12) United States Patent
Brown et al.

(10) Patent No.: US 11,042,961 B2
(45) Date of Patent: Jun. 22, 2021

(54) SPATIAL PROCESSING FOR MAP GEOMETRY SIMPLIFICATION

(71) Applicant: Risk Management Solutions, Inc., Newark, CA (US)

(72) Inventors: Julien Brown, San Francisco, CA (US); Valli Gadiyaram Venkata, Fremont, CA (US); Shruthi Bhat, Sunnyvale, CA (US)

(73) Assignee: RISK MANAGEMENT SOLUTIONS, INC., Newark, CA (US)

( * ) Notice: Subject to any disclaimer, the term of this patent is extended or adjusted under 35 U.S.C. 154(b) by 0 days.

(21) Appl. No.: 16/898,125

(22) Filed: Jun. 10, 2020

(65) Prior Publication Data

US 2020/0394753 A1 Dec. 17, 2020

Related U.S. Application Data

(60) Provisional application No. 62/862,664, filed on Jun. 17, 2019.

(51) Int. Cl.
*G06T 3/40* (2006.01)
*G06T 7/50* (2017.01)

(52) U.S. Cl.
CPC ............ *G06T 3/40* (2013.01); *G06T 7/50* (2017.01); *G06T 2207/20016* (2013.01); *G06T 2207/30184* (2013.01)

(58) Field of Classification Search
CPC ... G06T 3/40; G06T 7/50; G06T 2207/20016; G06T 2207/30184
See application file for complete search history.

(56) References Cited

U.S. PATENT DOCUMENTS

| | | | | |
|---|---|---|---|---|
| 2006/0170693 A1* | 8/2006 | Bethune | .................... | G06T 3/40 345/568 |
| 2013/0322702 A1* | 12/2013 | Piemonte | ............ | G06F 16/2291 382/113 |
| 2013/0328879 A1* | 12/2013 | Carbonneau | ........... | G01C 21/32 345/440 |
| 2014/0071119 A1* | 3/2014 | Piemonte | .............. | G06T 19/003 345/419 |
| 2019/0355091 A1* | 11/2019 | Gierach | .................. | G06T 11/40 |

FOREIGN PATENT DOCUMENTS

KR    2007 0061336 A    6/2007

OTHER PUBLICATIONS

Liu, Z., Jiang, B., & Heer, J. (Jun. 2013). imMens: Real-time visual querying of big data. In Computer Graphics Forum (vol. 32, No. 3pt4, pp. 421-430). Oxford, UK: Blackwell Publishing Ltd.*
The International Searching Authority, "Search Report" in application No. PCT/US2020/037224, dated Oct. 1, 2020, 18 pages.

(Continued)

*Primary Examiner* — Sarah Lhymn
(74) *Attorney, Agent, or Firm* — Hickman Becker Bingham Ledesma LLP

(57) ABSTRACT

A computer system and related computer-implemented methods are disclosed. The system is programmed to simplify one or more digital maps for a geographical region by reducing their sizes while maintaining their physical appearances to the human eyes.

20 Claims, 6 Drawing Sheets

(56) References Cited

OTHER PUBLICATIONS

Marco Vona et al., "Hierarchical Spatial Distribution of Seismic Risk of Italian RC Buildings Stock", In: Lecture Notes on Computer Science, vol. 10405, dated 2017, pp. 217-229.
Ingmar De Beukelaar, "Cartographic Implications of Vector Title Technology", Master's Thesis, dated Feb. 28, 2018, pp. 1-131.
Current Claims in application No. PCT/US2020/037224, dated Oct. 2020, 6 pages.

* cited by examiner

SPATIAL PROCESSING FOR MAP GEOMETRY SIMPLIFICATION

BENEFIT CLAIM

This application claims the benefit under 35 U.S.C. § 119(e) of provisional application 62/862,664, filed Jun. 17, 2019, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

The present disclosure relates to methods, computer software, and/or computer hardware in the field of electronic mapping. More specifically, the present disclosure relates to computer-implemented techniques for generating simplified electronic map tiles for use in client map application programs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digitally stored electronic maps can be used to display geographic or location-based information to users of mapping programs or applications. These mapping applications often utilize a grid-based arrangement of map data, referred to herein as map tiles, to organize and display map data.

Each map tile may correspond to a portion of a geographic map. For example, a map tile may correspond to a square area of a geographic map at a particular zoom level, or an area of a pre-defined size and location within a geographic map. Map tiles may contain geometry data describing features of the geographic map, such as roads, buildings, borders, bodies of water, parks, etc. Additionally, map tiles may contain data describing these features, such as names, labels, style data for renderers, risk level, or other information. Such data can be stored as metadata separately from the features or as additional features. Each feature corresponds to at least a cluster of neighboring pixels in a map tile. Each pixel can have one or more values associated with different features. Thus, a geographic map may correspond to a large number of map tiles, and each map tile may contain a large amount of data.

One challenge with representing massive amounts of data or detail in a fixed space is that the electronic map data requires a large amount of storage to store, device memory and network bandwidth to send and receive, and processing power to render.

A possible approach for reducing the amount of electronic data utilizes simplification algorithms. However, different sets of electronic map data have different characteristics that make visualizing them different from another. For example, a map of a sidewalk system compared to a map of a highway system would have different lines with different angles, and the features occupy real space at different levels. Applying simplification across the board to the different features would result in over-simplification of smaller features while larger features may not be sufficiently condensed. Additionally, if a simplification algorithm is applied too heavily, the simplified features would be visually inaccurate when rendered.

Thus, improved methods for generating simplified map data are needed.

DETAILED DESCRIPTION

Figure 1:
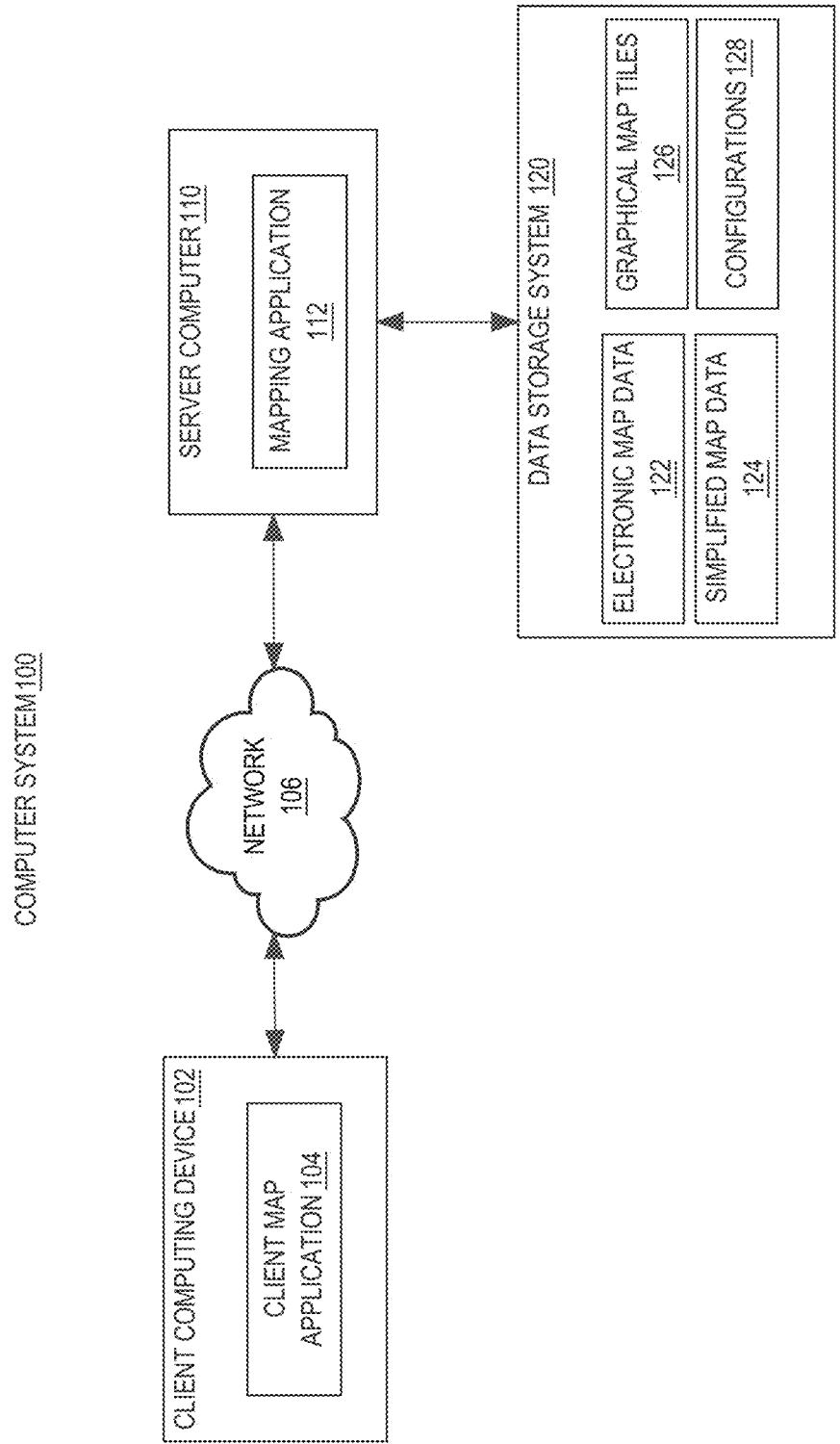
FIG. 1 illustrates an example computer system in which the techniques described herein may be practiced, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

1. General Overview

Techniques are described herein for generating simplified map data based on a set of electronic map data. Electronic map data may include geometry data that indicates how to render map features in a graphical map within a client map application. The simplified map data comprises less geometry or other data than the original electronic map data, but the graphical map rendered from the simplified map data is visually the same or similar to the graphical map rendered from the original electronic map data.

In an embodiment, the electronic map data, or digital map, for a geographical region, is divided into a plurality of map tiles. Each map tile is associated with a plurality of sub-region of the geographical region and may correspond to a portion of a geographical map at a particular zoom level. Generating the simplified map data comprises, for each map tile of the plurality of map tiles, a corresponding simplified map tile. When a particular map tile is requested by a client map application, the corresponding simplified map tile may be provided to the client map application instead of the particular map tile.

In an embodiment, generating a simplified map tile based on an original map tile comprises, for each map feature of a plurality of map features defined by the original map tile, determining whether to exclude the map feature from the simplified map tile. Determining whether to exclude a map feature may be based on, for example, the size of the feature, the shape of the feature, the number of pixels corresponding to the feature, the number of other features that correspond to the same or common pixel(s) as the feature, values associated with the feature, etc.

Additionally, generating a simplified map tile based on an original map tile may comprise, for each map feature of the plurality of map features, determining whether to merge the map feature with one or more other map features. Determining whether to merge a map feature with one or more other map features may be based on, for example, the shape of the feature, the shape of the one or more other map features, the number of other features that correspond to the same or common pixel(s) as the feature, values associated with the feature, etc.

In an embodiment, different combinations of these techniques can be applied at the local (single tile), cluster (neighboring tiles), or global (all tiles or entire map) level, to better address the varying nature of an original map in generating a simplified map.

After the simplified map tiles are generated, the simplified map data may be stored, often instead of the original map tile, in a data storage device and/or cached in memory. The stored/cached simplified map data may be retrieved in response to a request for a corresponding original map tile. Additionally or alternatively, a bitmap image may be rendered based on the simplified map tile. The bitmap image may be displayed at the client map application when displaying a portion of a map that corresponds to the simplified map tile.

Other embodiments, aspects, and features will become apparent from the disclosure as a whole. These techniques have the benefit of creating, storing, and transmitting, from a server computer storing map data to a remote client map application, only the map tile data needed to display a visual map at a requested resolution. Map tile data that includes details that are not visible at the requested resolution may be removed or reduced. Specifically, these techniques allow the simplification of map tiles at different granularities, such as zoom levels or map contexts, leading to a simplified map of a better quality from better preserving the physical appearance to human perception. The reduced size requires less data storage space, network bandwidth, and less processing power to render into a graphical image format for displaying by a display device. Therefore, embodiments can achieve significant reductions in computing resource requirements at a server computer and at a client computing device.

In an embodiment, a computer system for simplifying a digital map for display, comprises one or more memories; and one or more processors coupled to the one or more memories and configured to execute: receiving a digital map for a geographical region, the digital map being organized into a plurality of raw map tiles associated with a plurality of sub-regions of the geographical region; retrieving configuration data stored in the one or more memories, the configuration data being related to visibility to humans for simplifying the digital map; identifying one or more features from each of the plurality of raw map tiles, each feature of the one more features of each of the plurality of raw map tiles corresponding to a cluster of pixels within the raw map tile and having a value for each of the cluster of pixels, at least two features corresponding to a common pixel within a raw map tile of the plurality of raw map tiles; creating a plurality of modified map tiles forming a modified digital map for the plurality of raw map tiles, a total size of the plurality of modified map tiles being smaller than a total size of the plurality of raw map tiles, by eliminating or merging at least one feature in the plurality of raw map tiles, updating a value of a pixel within a feature in the plurality of raw map tiles, or reducing a size of a feature in the plurality of raw map tiles; storing, for each of the plurality of modified map tiles, the modified map tile and an indication of a corresponding raw map tile of the plurality of raw map tiles in the one or more memories. The creating comprises computing an aggregate of number of vertices in shapes of features in a raw map tile over a list of neighboring raw map tiles; selecting a particular raw map tile of the list of neighboring raw map tiles that has a number of vertices in shapes of features within the particular raw map tile that is greater than the aggregate by a particular amount from the configuration data; and generating a particular modified map tile for the particular raw map tile by reducing the number of vertices in the shapes of the features within the particular raw map tile.

In an embodiment, the one or more processors configured to further execute: receiving a request for a specific raw map tile of the plurality of raw map tiles; retrieving, from the one or more memories, a specific modified map tile of the plurality of modified map tiles that corresponds to the specific raw map tile; transmitting the specific modified map tile in response to the request to a display device.

In an embodiment, the system further comprises the display device.

In an embodiment, the configuration data including data for multiple zoom levels for viewing digital maps of the geographical region, the digital map corresponding to a zoom level of the multiple zoom levels. In an embodiment, the one or more processors configured to further receive a selection of a particular zoom level of the multiple zoom levels, the configuration data including smoothing functions allowing dynamic control of simplification of digital maps, as modified digital maps corresponding to successive zoom levels that have been selected are transmitted to a display device.

In an embodiment, the creating comprises: determining that a pixel resolution for a specific raw map tile of the plurality of raw map tiles is below a first threshold from the configuration data; determining that the specific raw map tile has a specific number of features that is greater than a second threshold from the configuration data; generating a specific modified map tile for the specific raw map tile by eliminating a feature of the specific number of features.

In an embodiment, the creating comprises: determining that a pixel resolution for a specific raw map tile of the plurality of raw map tiles exceeds a first threshold from the configuration data; determining that the specific raw map tile has a specific number of features including a feature that is larger than a second threshold from the configuration data; generating a specific modified map tile for the specific raw map tile by updating at least one value of a pixel in the feature.

In an embodiment, the creating comprises generating a specific modified map tile for a set of multiple raw map tiles of the plurality of raw map tiles by assigning a maximum of all values of pixels in features within the set of multiple raw map tiles to at least one pixel of the features within the set of multiple raw map tiles, the at least one pixel each not already having the maximum as a value.

In an embodiment, the creating comprises generating a specific modified map tile for a particular raw map tile of the plurality of raw map tiles by assigning a maximum of all values of pixels of certain features of the one or more features associated with the particular raw map tile that correspond to one or more common pixels to at least one pixel of the one or more common pixels of at least one of the certain features, the at least one pixel each not already having the maximum as a value.

In an embodiment, each value of a pixel of a feature within the digital map representing an amount of risk that a certain event of a list of events will take place.

In an embodiment, a pixel resolution of a particular raw map tile of the plurality of raw map tiles depending on a location of the sub-region associated with the particular raw map tile within the geographical region.

In an embodiment, one or more non-transitory computer-readable storage media stores instructions which when executed cause one or more processors to perform a method of simplifying a digital map, the method comprising: receiving, by the one or more processors, a digital map for a geographical region, the digital map being organized into a plurality of raw map tiles associated with a plurality of sub-regions of the geographical region; retrieving, by the one or more processors, configuration data stored in one or more memories, the configuration data being related to visibility to humans for simplifying the digital map; identifying one or more features from each of the plurality of raw map tiles, each feature of the one more features of each of the plurality of raw map tiles corresponding to a cluster of pixels within the raw map tile and having a value for each of the cluster of pixels, at least two features corresponding to a common pixel within a raw map tile of the plurality of raw map tiles; creating a plurality of modified map tiles forming a modified digital map for the plurality of raw map tiles, a total size of the plurality of modified map tiles being smaller than a total size of the plurality of raw map tiles, by eliminating or merging at least one feature in the plurality of raw map tiles, updating a value of a pixel within a feature in the plurality of raw map tiles, or reducing a size of a feature in the plurality of raw map tiles; storing, for each of the plurality of modified map tiles, the modified map tile and an indication of a corresponding raw map tile of the plurality of raw map tiles in the one or more memories. The creating comprises: computing an aggregate of number of vertices in shapes of features in a raw map tile over a list of neighboring raw map tiles; selecting a particular raw map tile of the list of neighboring raw map tiles that has a number of vertices in shapes of features within the particular raw map tile that is greater than the aggregate by a particular amount from the configuration data; and generating a particular modified map tile for the particular raw map tile by reducing the number of vertices in the shapes of the features within the particular raw map tile.

In one embodiment, the method further comprises: receiving a request for a specific raw map tile of the plurality of raw map tiles; retrieving, from the one or more memories, a specific modified map tile of the plurality of modified map tiles that corresponds to the specific raw map tile; transmitting the specific modified map tile in response to the request to a display device.

In one embodiment, the configuration data including data for multiple zoom levels for viewing digital maps of the geographical region, the digital map corresponding to a zoom level of the multiple zoom levels. In one embodiment, the one or more processors configured to further receive a selection of a particular zoom level of the multiple zoom levels, the configuration data including smoothing functions allowing dynamic control of simplification of digital maps, as modified digital maps corresponding to successive zoom levels that have been selected are transmitted to a display device.

In one embodiment, the creating comprises: determining that a pixel resolution for a specific raw map tile of the plurality of raw map tiles is below a first threshold from the configuration data; determining that the specific raw map tile has a specific number of features that is greater than a second threshold from the configuration data; generating a specific modified map tile for the specific raw map tile by eliminating a feature of the specific number of features.

In one embodiment, the creating comprises: determining that a pixel resolution for a specific raw map tile of the plurality of raw map tiles exceeds a first threshold from the configuration data; determining that the specific raw map tile has a specific number of features including a feature that is larger than a second threshold from the configuration data; generating a specific modified map tile for the specific raw map tile by updating at least one value of a pixel in the feature.

In one embodiment, the creating comprises generating a specific modified map tile for a set of multiple raw map tiles of the plurality of raw map tiles by assigning a maximum of all values of pixels in features within the set of multiple raw map tiles to at least one pixel of the features within the set of multiple raw map tiles, the at least one pixel each not already having the maximum as a value.

In one embodiment, the creating comprises generating a specific modified map tile for a particular raw map tile of the plurality of raw map tiles by assigning a maximum of all values of pixels of certain features of the one or more features associated with the particular raw map tile that correspond to one or more common pixels to at least one pixel of the one or more common pixels of at least one of the certain features, the at least one pixel each not already having the maximum as a value.

In one embodiment, a pixel resolution of a particular raw map tile of the plurality of raw map tiles depending on a location of the sub-region associated with the particular raw map tile within the geographical region.

2. System Overview

FIG. 1 illustrates an example computer system in which the techniques described may be practiced, according to one embodiment.

In an embodiment, a computer system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1 illustrates only one or many possible arrangements of components configured to execute the programming described herein. Other arrangements may include fewer or different components, and the division of work between the components may vary depending on the arrangement.

FIG. 1 illustrates a client computing device 102 that is coupled via a network connection 106 to a server computer 110, which is coupled to a data storage system 120. The server computer 110 comprises mapping application 112. Data storage system 120 stores electronic map data 122, simplified map data 124, graphical map tiles 126, and configurations 128. The client computing device comprises a client map application 104.

In one embodiment, client computing device 102 may be any computing device, including but not limited to: servers, personal computers, laptops, hand-held computers, cellular or mobile phones, portable digital assistants (PDAs), portable navigation devices, tablet computers, Internet appliances, wireless devices, wired devices, multi-processor systems, and the like. Additionally or alternatively, client computing device 102 may be a navigation system installed in a car or other vehicle. Although a single client computing device is depicted in FIG. 1, any number of client computing devices may be present. Each client computing device 102 is communicatively coupled to server computer 110 through network 106, which comprises any combination of a LAN, WAN, one or more internetworks such as the public Internet, a cellular network, or a company network.

Client computing device 102 also includes other hardware elements, such as one or more input devices, memory, processors, and the like, which are not depicted in FIG. 1. Client computing device 102 also includes applications, software, and other executable instructions to facilitate various aspects of embodiments described herein. These applications, software, and other executable instructions may be installed by a user, owner, manufacturer, or other entity related to client computing device. In one embodiment, client computing device 102 includes client map application 104 which is software that displays, uses, supports, or otherwise provides electronic mapping functionality as part of the application or software. Client map application 104 may be any type of application, such as an impact analysis application, an event modeling application, a taxi service, a video game, a chat client, a food delivery application, etc.

Server computer 110 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 110 broadly represents one or more multiple server computers, such as a server cluster, and the server computer 110 may be located in one or more physical locations. Server computer 110 may also represent one or more virtual computing instances that execute using one or more computers in a datacenter such as a virtual server farm.

In an embodiment, server computer 110 is communicatively connected to data storage system 120 and client computing device 102 through any kind of computer network using any combination of wired and wireless communication, such as through network 106.

In an embodiment, data storage system 120 is a data storage subsystem consisting of programs and data that is stored on any suitable storage device such as one or more hard disk drives, memories, or any other electronic digital data recording device configured to store data. Although data storage system 120 is depicted as a single device in FIG. 1, data storage system 120 may span multiple devices located in one or more physical locations. For example, data storage system 120 may include one or more nodes located at one or more data warehouses. Additionally, in one embodiment, data storage system 120 may be located on the same device(s) as server computer 110. Alternatively, data storage system 120 may be located on separate device(s) from server computer 110.

In an embodiment, data storage system 120 stores data used by server computer 110 to generate simplified map tiles and/or to provide simplified map tiles to client computing device 102, including electronic map data 122 and simplified map data 124. In an embodiment, electronic map data 122 is digital map data that is provided, either directly or indirectly, to client map applications such as client map application 104. The electronic map data 122 may be processed to generate simplified map data 124. In the illustrated embodiment, data storage system 120 also stores or caches rendered graphical map tiles 126 and configurations 128.

In an embodiment, configurations 128 may be a database, a configuration file, or any other data file that stores configurations such as settings, preferences, parameters, thresholds, or protocols. Configurations 128 may store a plurality of configurations, where each configuration is associated with one or more respective client map applications, one or more respective sets of electronic map data, and/or one or more respective map zoom levels.

For example, configurations 128 may store configurations for the methodologies described below. The configurations include configuration data related to visibility to humans and include various thresholds or settings to facilitate simplification of map data to help maintain or improve the visual appeal of the map without rendering the resulting maps looking visibly or significantly different to human eyes. The configurations may indicate parameter values such as distance tolerance, geometry snapping, numerators, denominators, and default values. The parameter values may differ depending on the target client map application, the particular set of electronic map data being simplified, and/or the zoom level associated with a map tile being simplified. A configuration may also indicate which methodologies should be applied to which map features. As discussed in further detail below, the configurations may be overridden by statistical conditions. For example, if a dataset contains more than a threshold number of points, then point simplification, i.e. reduce to a point methodology may be utilized.

Additionally, configurations 128 may be modified by a user or administrator through one or more computers, such server computer 110, or any other computer. A user interface may be presented for entering or modifying parameter values, selecting or modifying data sets to which a configuration applies, and etc. Additionally or alternatively, a user name store a configuration file to configurations 128 in association with one or more target client map applications and/or one or more target sets of electronic map data. Configurable parameters, per resolution (zoom level), with smoothing functions allows users to dynamically control the map feel from all the way zoomed out to all the way zoomed in, and control representation of the data for different viewports.

Server computer 110 may host or execute a mapping application 112 and may include other applications, software, and other executable instructions to facilitate various aspects of embodiments described herein.

In an embodiment, mapping application 112 comprises program instructions that are programmed or configured to retrieve map data from electronic map data 122, analyze the map data, and generate one or more optimized map tiles based on the map data. An optimized map tile is a map tile that includes simplified and/or fewer geometric elements than an original map tile.

In an embodiment, the program instructions may be configured to generate the one or more optimized map tiles in response to receiving a request for one or more original map tiles. Additionally or alternatively, the program instructions may be configured to generate and store the one or more optimized map tiles in advance.

In an embodiment, an optimized map tile comprises electronic map data that, when rendered, is visually the same as or similar to the corresponding original map tile. As described in further detail below, generating the optimized map tile may involve determining whether to include or exclude map features from the original map tile. Additionally, generating the optimized map tile may involve determining whether to merge two or more map features from the original map tile.

Additionally, mapping application 112 may comprise program instructions that are programmed or configured to provide electronic mapping to client map application 104, such as receiving map tile requests from client computing devices, sending electronic map data to client computing devices, receiving electronic map source data 122 from data providers, processing electronic map data 122 to generate simplified map data 124, and any other aspects of embodiments described herein.

For the purpose of illustrating a clear example, the foregoing description has ascribed certain operations, functions, and programming to the mapping application 112 of FIG. 1. However, in other embodiments, the same operations, functions, and programming may be implemented in programs or logic that is separate from the mapping application 112, such as a utility program or library. For example, the function of rendering a simplified map tile into a graphical map tile may be implemented in a library that the program instructions of mapping application 112 call. Additionally or alternatively, mapping application 112 may communicate or interface with any other applications, software, or modules that are executed by server computer 110, such as operating systems or drivers, as needed to implement the functionality described herein.

3. Map Tile Overview

In an embodiment, electronic map data 122 is digital map data that is provided, either directly or indirectly, to client map applications such as client map application 104. Electronic map data 122 may be based on raw digital map data that is obtained, downloaded, or received from a variety of sources. The raw digital map data may include satellite images, digital street data, building or place data, or terrain data. Example sources include National Aeronautics and Space Administration (NASA), United States Geological Survey (USGS), and DigitalGlobe. Raw digital map data may also be defined by a user and uploaded to the server computer. Once obtained or received, the raw digital map data is used to generate electronic map data 130. For example, the raw digital map data may be processed and organized as a plurality of vector map tiles.

In an embodiment, electronic map data 122 comprises a plurality of map tiles. Each map tile may correspond to a portion or sub-region of a geographic map. For example, a particular map tile may correspond to a square area of a geographic map at a particular zoom level, or an area of a pre-defined size and location within a geographic map.

Additionally, the plurality of map tiles may be organized into a grid-based arrangements. A geographic map area may be divided into grid, e.g. squares, where each tile corresponds to a block within the grid. An example grid-based system includes the quadkey system described by Ricky Brundritt, Chris French, and Saisang Cai in "Bing Maps Tile System," https://docs.microsoft.com/en-us/bingmaps/articles/bing-maps-tile-system, the contents of which are incorporated by reference herein. In a quadkey system, at the lowest zoom level (furthest zoomed out), the geographic map is divided into one or more tiles. At the next zoom level, each tile is divided into four sub-tiles, and so on. The tiles may be referenced or indexed based on their parent tile(s).

For example, assume at the lowest zoom level, the geographic map is divided into four tiles, tile 0, tile 1, tile 2, and tile 3. Tile 0 is divided into four sub-tiles, which may be referenced or indexed as tile 00, tile 01, tile 02, and tile 03, where the first number refers to tile 0, and the second number refers to the sub-tile's location within tile 0. Similarly, sub-tiles of tile 00 may be refenced or indexed as tiles 000, 001, 002, and 003, and so on.

In an embodiment, each map tile contains data describing map geometries, such as points, lines, and polygons, of features on the map. For example, electronic map data corresponding to a portion of a geographic map may include geometry data representing roads, buildings, water, parks, and etc. located within the portion of the geographic map, as well as geometries for suggested placement of labels and other cartographic features. The electronic map data for a feature may include data indicating a shape of the feature, such as a point, line, polygon, multiple points, multiple lines, or multiple polygons, and may also include data indicating the coordinates within the map tile for the shape. For example, electronic map data for a street may include geometry data indicating that the shape of the street comprises multiple lines, an array of coordinates corresponding to end points of the multiple lines, and a width for each line of the multiple lines.

Additionally or alternatively, the map tile contains metadata describing attributes of features within the map tile, such as road names, place names, house numbers, feature types, elevation, and other properties. The metadata may include data corresponding to each feature, such as names, that can be rendered as labels on a digital map. Additionally or alternatively, the metadata may include data indicating the portion of the geographic map that the map tile corresponds to. For example, the metadata may include data indicating one or more coordinates of the map tile or one or more boundaries of the map tile.

To display a map tile, a vector map tile may be rendered into a raster (bitmap) image, also referred to herein as a graphical map tile. When displayed together, a set of graphical map tiles form an image depicting a visual map of an area. The graphical map tiles may be the same size, e.g. 250 pixels by 250 pixels. Each graphical map tile may also correspond to a particular square area of a geographic map at a particular zoom level.

In an embodiment, graphical map tiles may be rendered ahead of time and stored in data storage system 120. When one or more map tiles are requested by client map application 104, the graphical map tiles are retrieved and sent to client computing device 102.

4. Geometry Simplification

In an embodiment, in order to reduce the amount of storage space required to store map tiles, simplified map data 124 is generated based on the electronic map data 122. In an embodiment, generated simplified map data 124 comprises generating a simplified map tile for each original map tile of a plurality of original map tiles in electronic map data 122. Additionally or alternatively, simplified map data 124 may be generated after receiving raw digital map data, while processing the raw digital map data to generate map tiles.

In an embodiment, generating a simplified map tile based on an original map tile comprises, for each map feature of a plurality of map features defined by the original map tile, determining whether to exclude the map feature from the simplified map tile. Determining whether to exclude a map feature may be based on, for example, the size of the feature, the shape of the feature, the number of pixels corresponding to the feature, the number of other features that correspond to the same pixel(s) as the feature, values associated with the feature, etc. Excluding a map feature from a map tile may include removing map data corresponding to the map feature from the map tile, such as geometry data and any associated metadata.

Additionally, generating a simplified map tile based on an original map tile may comprise, for each map feature of the plurality of map features, determining whether to merge the map feature with one or more other map features. Determining whether to merge a map feature with one or more other map features may be based on, for example, the shape of the feature, the shape of the one or more other map features, the number of other features that correspond to the same pixel(s) as the feature, values associated with the feature, etc. Merging two or more map features in a map tile may include applying a unary union operation to the geometric data corresponding to the two or more map features to generate geometric data corresponding to a single unified geometric shape.

For example, the geometry data for a first map feature may define a first polygon using a first set of points, and the geometry data for a second map feature may define a second polygon using a second set of points. Merging the first map feature and the second map feature may comprise combining the geometry data to generate a third polygon that includes at least a portion of the first set of points and a portion of the second set of points. Additionally, overlapping or unnecessary points may be removed to further simply the merged geometry.

In an embodiment, after map features in a map tile are removed and/or merged, the updated map tile is stored as a simplified map tile, for example in simplified map data 124. Additionally or alternatively, the updated map tile may be rendered into a graphical image and stored, for example in graphical map tiles 126.

In an embodiment, generating a simplified map tile may be based on the location of one or more points, lines, shapes, and/or map features within the map tile with respect to real dimensional space. Additionally or alternatively, generating the simplified map tile may be based on the location of one or more points, lines, shapes, and/or features within the map tile with respect to pixel space. Various techniques for generating simplified geometry may be based on analyzing map features within real space and/or pixel space.

4.1 Real Space

Real space refers to measurements in real units, in the coordinate system being used by the map data, e.g. kilometers or miles. As discussed above, each map tile may correspond to a square area within a geographic map. Each point, line, shape, feature, etc. within the map tile corresponds to a respective point, line, shape, or feature within the geographic map. Real space measurements may indicate the size, length, width, area, etc. of a map feature. In an embodiment, electronic map data for a feature may include data indicating one or more real space measurements corresponding to the feature. Additionally or alternatively, one or more real space measurements may be calculated based on the current viewport, e.g. square area and zoom level, of the map tile, and coordinates corresponding to the map feature.

Using real space may be more accurate for clustering or grouping operations when compared with other resolution strategies.

4.2 Pixel Space

Pixel space, or coordinate space, refers to measurements in terms of pixels within the graphical map tile image that is rendered from a map tile. As discussed above, each map tile may correspond to a square area within a geographic map. When the map tile is rendered as a graphical image, each point, line, shape, feature, etc. within the map tile is rendered in the graphical image. Pixel space measurements indicate one or more pixels that correspond to a map feature.

Depending on a current viewport, e.g. square area and zoom level, each pixel in the current viewport corresponds to a specific unit of measurement. For example, at a particular zoom level 1 pixel may correspond to 100 kilometers.

In an embodiment, translation from real space to coordinate space may be calculated based on quadkey resolution. An example equation for measuring distance in a tile horizontally at the equator may be:

$$\text{Tile Resolution} = C \cdot \cos(\text{latitude})/2^{\text{zoom level}}$$

where C refers to the circumference of the earth. Then the size of the pixel can be determined by $$\text{Pixel Size} = \text{Tile Resolution}/\text{Tile Size}$$

For calculating pixel size, the bounds of the feature may be used unless the feature is a point, in which case a box will be drawn around the point. Pixel space is roughly translated up and down the equator.

Using pixel space may be more beneficial for determining what's useful to see for the human eye within a viewport.

4.3 Statistical Context

Statistical context may be used to determine and/or modify parameters used for the techniques discussed below. Statistical context may include global context, neighbor context, and local context.

Global contexts calculate statistics on features across the entire dataset. In an embodiment, global context calculation is done in a distributed manner using a plurality of compute nodes. For example, global contexts may be calculated using one or more Apache Spark clusters. Global contexts may be used for aligning features with statistical factors across an entire data set. For example, assume the 10% smallest map features within a map view will be dropped, and the map view comprises a plurality of map tiles. Global context may be used to analyze the features within the plurality of map tiles to determine the 10% smallest map features.

Neighbor contexts calculate statistics on features across a tile and one or more of its neighboring tiles. This may useful for smoothing features based on the neighboring tiles, for example if a feature connects to one or more other features in a neighboring tile, or if a feature extends into a neighboring tile.

Local contexts calculate statistics on features in a single tile. This may be used for comparing features within a single tile. For example, local context may be used to determine the size of a feature relative to other features within the map tile.

In an embodiment, statistical contexts may be used to determine how map features in a map tile should be simplified. Mean vertices simplification comprises reducing the number of vertices in the shape of a map tile to fit a curve across all features in a local data context. Using neighboring context, the number of vertices of features in the shape of the map tile and in the neighboring map tiles are analyzed, and based on the analysis, a set of percentiles or another aggregate of the number of vertices is determined. Map features in the map tile are merged or excluded or the shape of a map feature in the map tile is altered so that the number of features with particular number of vertices and/or the number of vertices overall matches the percentiles in the set of percentiles or other aggregate values. For example, the average number of vertices in the shape of a feature in a set of neighboring map tiles may be ten vertices. The configuration data may indicate a difference of no more than three vertices for maintaining an overall consistent look in the shapes of the features. Therefore, when the shape of a feature has more than thirteen vertices, the shape could be smoothed to reduce the number of vertices in the shape. This will ensure that shapes within a tile fit a similar shape and feel.

4.4 Factors

As explained in further detail below, various factors may be used to determine whether to exclude and/or merge features. In an embodiment, the factors are calculated in two dimensions—real coordinate space and viewport pixel space. Real coordinate space refers to the coordinate space around a feature. Viewport pixel space refers to the pixels around a feature.

Factors that may be calculated in real coordinate space include: minimum, maximum, mean/average, and percentile area; minimum, maximum, mean/average, and percentile length; minimum, maximum, mean/average, and percentile width; minimum, maximum, mean/average, and distribution of line skew; average line shape; and minimum, maximum, mean, and percentile number of vertices.

Factors that may be calculated in viewport pixel space include: minimum number of pixels, maximum number of pixels, mean/average number of pixels, percentile number of pixels, distribution of number of pixels, and coordinate distribution of pixels.

5. Geometry Simplification

As discussed in further detail below, techniques for geometry simplification in map tiles include pixel resolution feature exclusion, pixel resolution feature merge, value based feature merge, value based feature exclusion, average feature shape detection, range based feature detection, means vertices simplification, and point simplification. The methods may be used separately or in combination, and any number of methods may be used, depending on the embodiment.

5.1 Feature Detection

Feature detection may be used for grouping features into categories. Additionally or alternatively, detection techniques may be used to determine which techniques should be applied to a map feature, or whether a particular technique should be used for a map feature.

In an embodiment, feature detection includes average feature shape detection. Average feature shape detection comprises calculating the average feature shape for a local data context. The shape is generally formed by straight or curved lines. Calculating the average feature shape may be based on factors such as the number of vertices of the feature and the length and width of the feature.

The features may be sorted into categories prior to applying other techniques, such as merge or exclusion. As an example, features that have 4 vertices with the same length and width may be categorized as squares. The system may determine that all squares in the map tile should be merged together. As another example, all features with a length greater than a certain value may be grouped together and subsequently merged. This may be useful, for example, for detecting features such as river tributaries that compose a greater geographic feature.

Additionally, feature detection may include range-based feature detection. Range-based feature detection comprises determining features whose values fall within a particular range. In an embodiment, the range threshold is dynamically calculated from the global data statistical contexts described below. Additionally or alternatively, the range threshold may be explicitly configured.

Range-based feature detection may be beneficial for determining which features to include or exclude based on a range for value, such as a number of vertices, length, width, area covered by the feature, etc. discussed above. The particular value may depend on the type of feature, the configuration, and/or the particular implementation.

5.2 Feature Exclusion

In an embodiment, generating a simplified map tile based on an original map tile comprises, for each map feature of a plurality of map features defined by the original map tile, determining whether to exclude the map feature from the simplified map tile. Determining whether to exclude a map feature may be based on, for example, the size of the feature, the shape of the feature, the number of pixels corresponding to the feature, the number of other features that correspond to the same pixel(s) as the feature, values associated with the feature, etc.

In an embodiment, determining whether to exclude a map feature is performed using pixel resolution feature exclusion. In a real space context, the number of features within a tile may be so dense that inclusion of a feature does not provide any visual benefit, at the cost of occupying more storage space. In an embodiment, pixel resolution feature exclusion comprises determining the pixel resolution of a feature and determining whether or not to exclude the feature based on the pixel resolution.

In an embodiment, determining whether to exclude a feature based on pixel resolution comprises determining whether the pixel resolution exceeds or falls below a particular threshold in the configuration data. The threshold may be a local threshold, e.g. within the particular map tile. Additionally or alternatively, the determination may be based on whether the pixel resolution exceeds or falls below a global threshold to ensure smooth transition and representation of features in a pixel space, e.g. across all map tiles at a particular zoom level. For example, when the resolution is low, not all features may be visible, so some could be eliminated. Therefore, when the number of features in a map tile exceeds a certain threshold based on the configuration data, some of the features can be eliminated.

In an embodiment, threshold is based on a percentage-wise, per-pixel limit on features. In one embodiment, only the top 10% largest features may be included in the map tile, and anything smaller than the top 10% largest features will not be included. Additionally or alternatively, in each pixel, the top 10% smallest features are included in the map tile, and anything larger than the smallest 10% are not included.

In an embodiment, the global threshold is the smallest real space corresponding to a pixel that will be included in any given tile. A window function may be used to calculate the global statistics for the area of polygons and then the corresponding pixel values can be calculated from said statistics. Features may then be filtered out based off of a specified percentage. For example, features occupying the bottom 10% smallest pixels may be excluded.

Pixel resolution feature exclusion may be beneficial for including features such as large rivers or bodies of water while leaving out smaller ones. The configurations for this method may be a parameter in the system configuration, such as configurations 128. This can be adjusted per set of electronic map data to achieve the visual representation of data desired for each set of electronic map data.

Additionally or alternatively, determining whether to exclude a map feature is performed using value-based feature exclusion. In an embodiment, value-based feature exclusion comprises excluding features whose values fall within a pre-defined range. Additionally or alternatively, the range may be a statically calculated range from the global data context described above.

Value-based feature exclusion may be beneficial for including features based on values associated with the feature, regardless of their size. For example, for a map that depicts risk associated with map features, values may correspond to a risk value of the feature. E.g. a value of 0 corresponds to features with low risk and a value of 100 corresponds to features with high risk. Value-based feature exclusion may be used to highlight high-risk features, regardless of their size, in order to appropriately convey "risky" areas to end users even if the areas are small.

5.3 Feature Merge

In an embodiment, generating a simplified map tile based on an original map tile may comprise, for each map feature of the plurality of map features, determining whether to merge the map feature with one or more other map features. Determining whether to merge a map feature with one or more other map features may be based on, for example, the shape of the feature, the shape of the one or more other map features, the number of other features that correspond to the same pixel(s) as the feature, values associated with the feature, etc.

In an embodiment, determining whether to merge two or more map features is performed using pixel resolution feature merge. Pixel resolution feature merge comprises translating features into a pixel space and merging any features that occupy the same coordinates. This differs from feature exclusion in that the final shape is augmented by the number of features occupying the space, rather than only including the largest/smallest feature.

In some embodiments, feature exclusion may be performed in conjunction with feature merge. In an embodiment, determining whether to merge or exclude a feature is based on user input and/or a configuration file. Additionally or alternatively, the determination may be calculated dynamically based on the input data, for example, if tiles exceed pre-defined limits such as a maximum number of features. The flexibility to perform feature exclusion and feature merge independently or in conjunction affords the end user the ability to render dynamic datasets without much modification or user input.

Additionally or alternatively, determining whether to merge two or more map features is performed using value-based feature merge. In an embodiment, value-based feature merge comprises merging features whose values are the same, or whose values fall within a pre-defined range. Additionally or alternatively, the range may be a statically calculated range from the global data context described above. Additionally or alternatively, the range threshold may be explicitly configured, for example, in configurations 128.

As an example, assume a first feature is associated with values [2, 4, 4.5, 4.25] and a second feature is associated with values [4.75, 5, 8, 9]. If a threshold of 1 were used, the first and second feature may be merged, and the merged feature associated with the values [2, 4, 8, 9].

Similar to value-based feature exclusion, the values may correspond to characteristics of a feature. The values may be specified in metadata associated with a map feature. For example, for a map that illustrates risk associated with map features, the feature value may correspond to a risk level or a risk zone for events such as flood or earthquakes. These values may be beneficial for scenarios such as highlighting risky fault lines or hurricane zones.

5.4 Point Simplification

In an embodiment, generating a simplified map tile based on an original map tile may comprise reducing the number of points corresponding to a map feature. Reducing the number of points may comprise reducing the number of vertices in a polygon corresponding to a map feature and/or representing a map feature using fewer points.

In an embodiment, representing a map feature using fewer points comprises representing the map feature using a single point rather than multiple points or one or more line(s) or polygon(s). Additionally or alternatively, two or more map features may be merged into a single point. At a zoomed out resolution, reduction of merged data to a single point may be advantageous in order to preserve the texture and general feel of the data, while reducing the number of points in a dataset.

In an embodiment, a feature is reduced to a single point occupying a pixel, if the feature's extent occupies a number of pixels that is not greater than the window function threshold. For example, assume 90% of features occupy 5 or more pixels, but a feature that is the bottom 10% of to-be-excluded features occupies 3 pixels. The feature may be included at a trade-off for 1 pixel for representation in the final image.

6. Feature Value Operations

Besides modifying the visual element, the value for features have to be dynamically changed to reflect changes. In an embodiment, this is achieved through defining strategies for various zoom levels in a configuration file, with default values. For example, when the resolution is high, a large feature may be represented by many pixels having similar values, so some values do not need to be explicitly stored. One way to implement this is to associate a pixel with neighboring pixels and resetting or skipping the values of the neighboring pixels. Therefore, when the size of a feature in a map tile exceeds a certain threshold based on the configuration data, some values of the pixels in the features can be updated.

In an embodiment, for features that overlap, a value is selected to represent the overlap/merged area. The value may be selected by taking the highest value of a set of values, taking the lowest value of the set of values, taking the average of the set of values, or taking the most recurring value (i.e. the mode). For example, a geographical location may have different (overlapping or non-overlapping) geographical features, which are associated with different risk levels. In some cases, it is most valuable to show the maximum risk level for the location. Therefore, the maximum value of all values of a pixel or a cluster of pixels can be shown for the pixel or the cluster of pixels in the modified map tile, depending on the scope of the geographical location.

In an embodiment, for weighted operations, a weight is assigned to a feature relative to other features in the same time. For example, assume there are 4 features with values: A=1, B=25, C=100, D=100. If the feature A is to be merged with B, the assigned weight would be 26 (1+25), with a calculated normal weight of 13 for feature A. Since relative to the other values in the tile this falls in the bottom 50%, its value may be weighted lower (23% of the value based off the average of all values in the tile, 56.5) thus rendering as a value of approximately 10.

In an embodiment, for indexed operations, feature values may be calculated similar to weighted operations, but given a window of multiple tiles around as specific area. E.g. a set of neighboring tiles or a region of interest defined by the quadkey.

7. Example Process Overview

Figure 2:
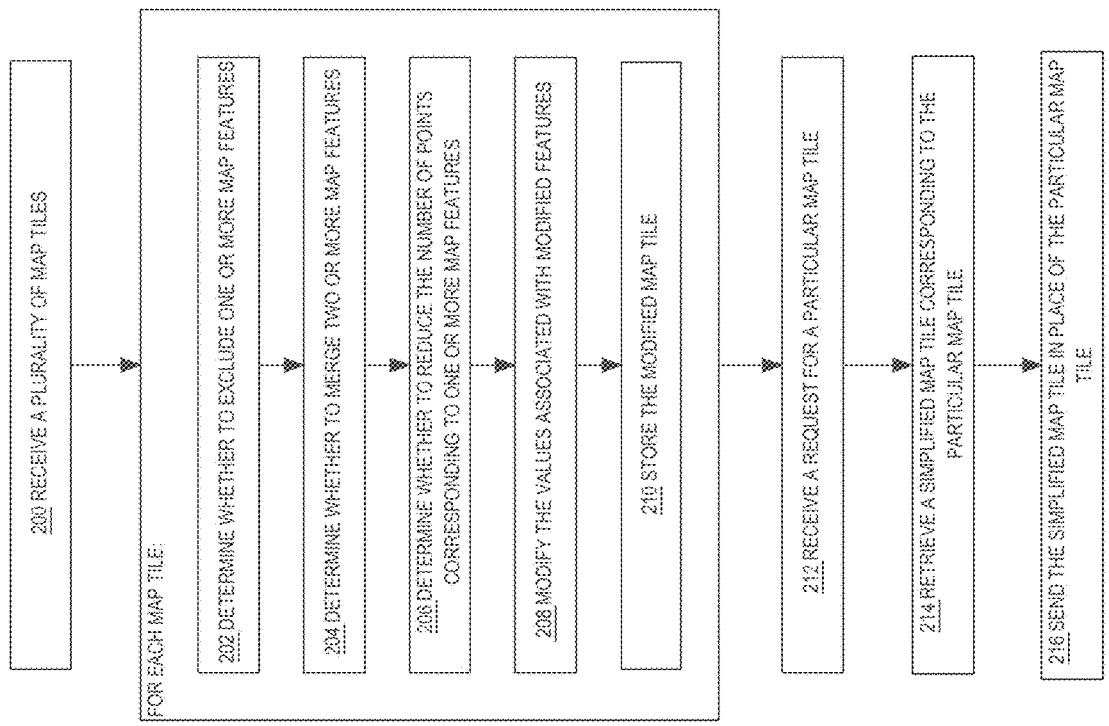
FIG. 2 illustrates an example programmable algorithm or method in accordance with an embodiment.

FIG. 2 illustrates an example programmable algorithm or method for generating a simplified map tile based on an original map tile.

Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations, and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan, or specification of an algorithm for programming a computer to execute the functions that are described.

In step 200, a server computer receives or retrieves electronic map data comprising a plurality of map tiles, such as electronic map data 122. The electronic map data may be received or retrieved as part of executing an application, program, script, or other program instructions for generating simplified electronic map data, such as mapping application 112. For example, a user may specify electronic map data 122 as a target for generating simplified electronic map data through a user interface of mapping application 112. Additionally or alternatively, the electronic map data may be received or retrieved as part of the server computer importing and storing electronic map data to data storage system 120. Additionally or alternatively, the electronic map data may be received or retrieved in response to the server computer receiving a request for electronic map data from a client map application, such as client map application 104.

After the map tile is received, steps 202-210 are performed for each map tile of the plurality of map tiles to generate a corresponding simplified map tile for each map tile.

At step 202, the server computer determines whether to exclude one or more map features of a plurality of map features in the map tile. In an embodiment, determining whether to exclude map features comprises determining, for each feature of the plurality of features, a pixel resolution of the feature and determining whether the pixel resolution exceeds a particular threshold value. Additionally or alternatively, determining whether to exclude map features may comprise determining, for each feature of the plurality of features, a value associated with the feature, and determining whether the value falls within a particular range of values.

Figure 4:
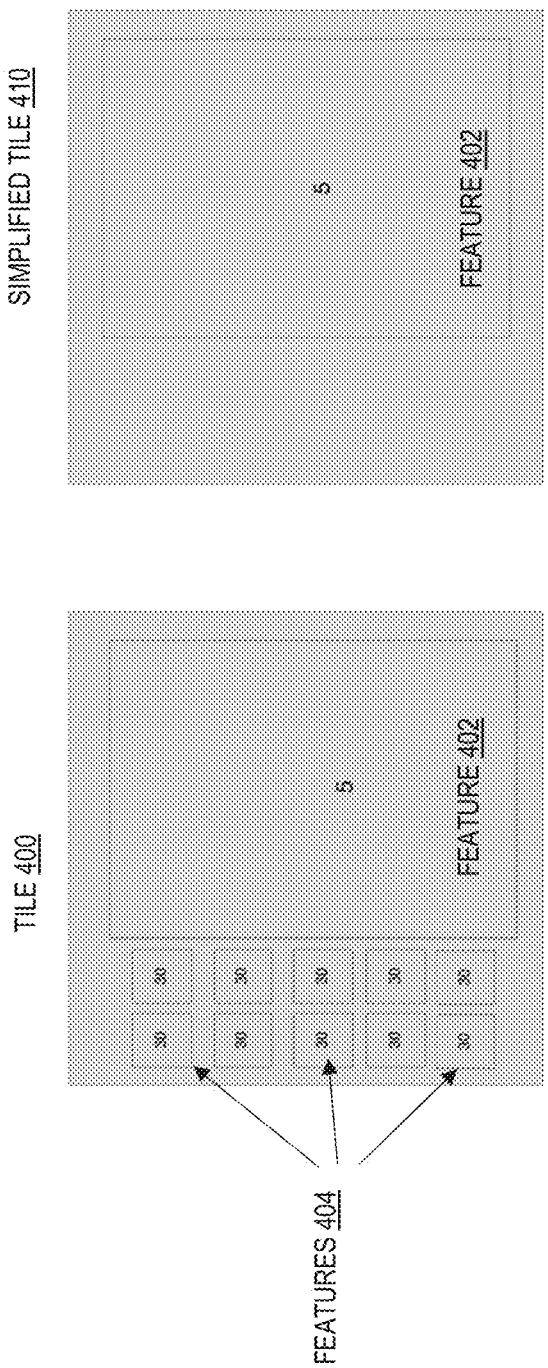
FIG. 4 illustrates an example map tile and an example simplified map tile.

FIG. 4 illustrates an example map tile 400. Map tile 400 comprises a plurality of features, such as features 404 and 402. Each feature 404 is associated with feature value 30, and feature 402 is associated with feature value 5. Additionally, features 404 are a smaller size than feature 402.

Assume pixel-resolution feature exclusion is applied to map tile 400, such that the pixel resolution of the features 404 is below the threshold value but the pixel resolution of feature 402 is above the threshold value. In the illustrated example, each of features 404 have been excluded from simplified tile 410 but feature 402 is included in simplified tile 410. If value-based feature exclusion were applied to tile 400, depending on the threshold value, features 404 might not be excluded while feature 402 might be excluded, since the value of feature 402 is smaller than that of features 404.

Figure 5:
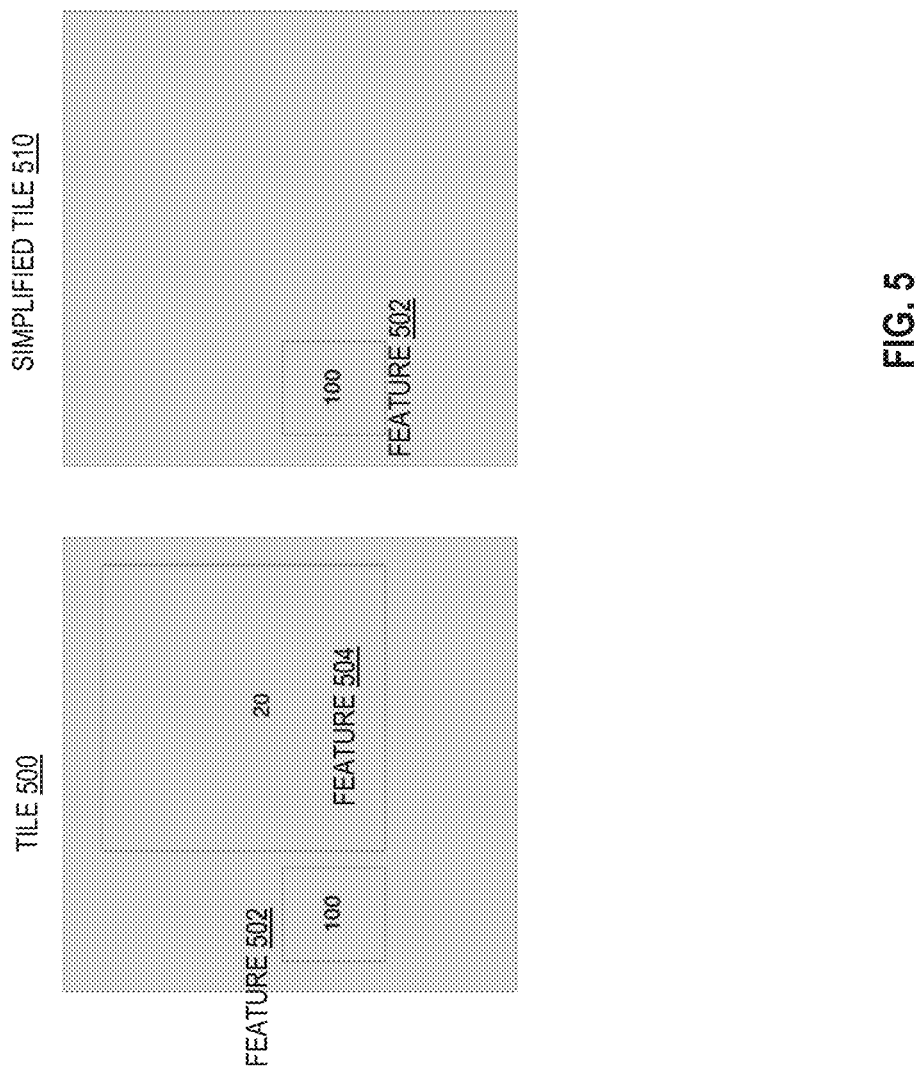
FIG. 5 illustrates an example map tile and an example simplified map tile.

FIG. 5 illustrates an example map tile 500. Map tile 500 comprises feature 502 and feature 504. Feature 502 is associated with a feature value of 100 and feature 504 is associated with feature value 20. However, feature 502 is smaller than feature 504.

Assume value-based feature exclusion is applied to tile 500, with a threshold feature value of 80. Feature 502 would not be excluded, as its feature value (100) exceeds the threshold value, but feature 504 would be excluded, as its feature value (20) falls below the threshold feature value. In the illustrated example, simplified map tile 510 includes feature 502 and does not include feature 504. If pixel-resolution feature exclusion were applied to tile 500, depending on the threshold size, feature 504 might be included while feature 502 might be excluded, since feature 502 is much smaller than feature 504.

At step 204, the server computer determines whether to merge two or more map features of the plurality of map features in the map tile. In an embodiment, determining whether to merge map features comprises determining, for each map feature of the plurality of map features, one or more pixels corresponding to the map feature, and merging map features that correspond to the same pixel(s) or correspond to a set of overlapping pixels. Additionally or alternatively, determining whether to merge map features comprises determining, for each feature of the plurality of features, one or more values associated with the feature, and merging map features whose associated values are the same or within a particular threshold of each other.

At step 206, the server computer determines whether to reduce the number of points that correspond to one or more map features of the plurality of map features in the map tile. In an embodiment, determining whether to reduce the number of points corresponding to a map feature comprises determining whether to reduce the number of vertices in a polygon corresponding to the map feature. Additionally or alternatively, determining whether to reduce the number of points corresponding to a map feature comprises determining whether to represent the map feature using a single point rather than a full set of data.

At step 208, the feature values of simplified map features are adjusted to reflect the changes. Adjusting the feature values may comprise removing values and other metadata associated with excluded map features. Additionally, adjusting the feature values may comprise combining the feature values for features that were merged or for portions of features that were merged.

Figure 6:
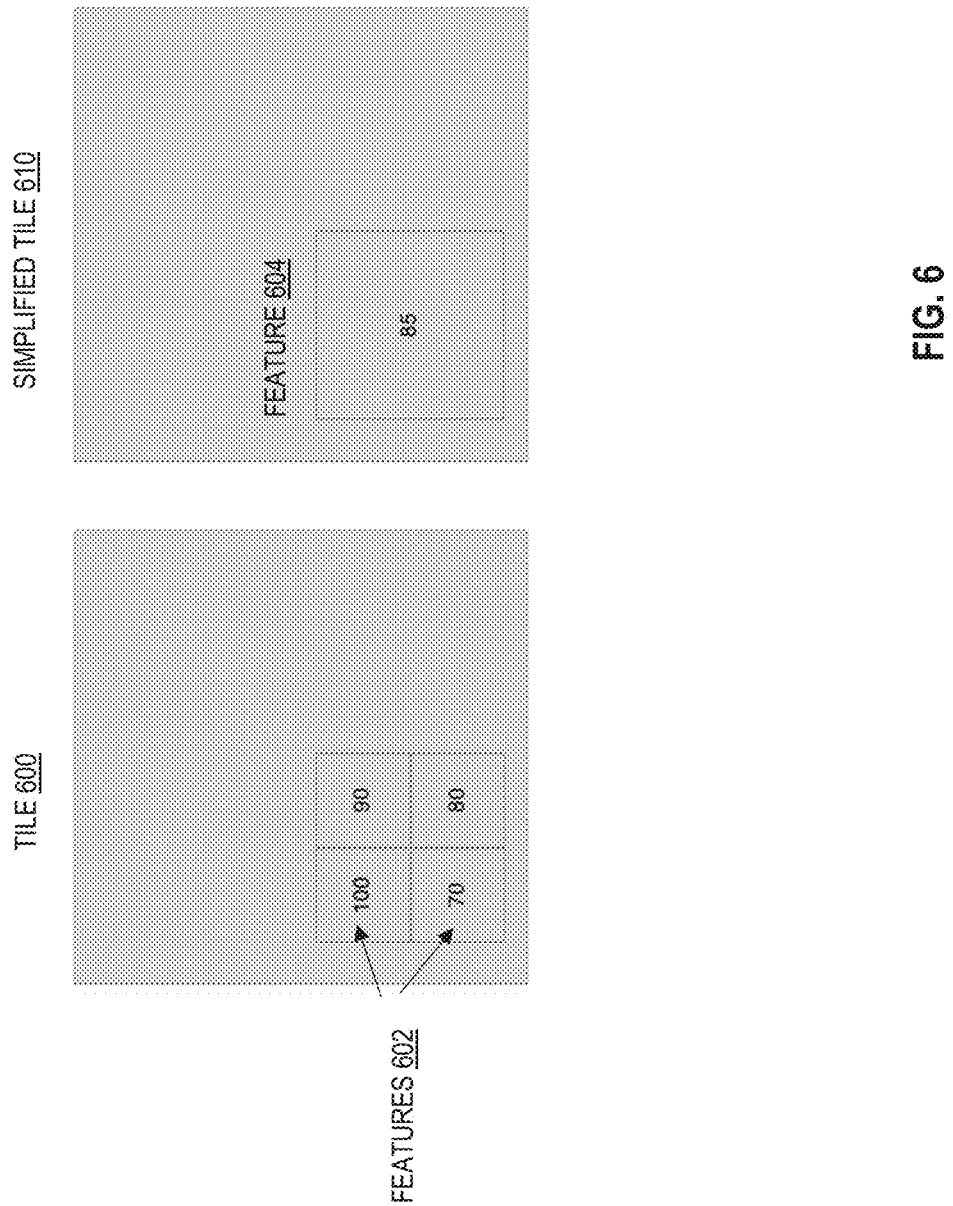
FIG. 6 illustrates an example map tile and an example simplified map tile.

FIG. 6 illustrates an example map tile 600. Map tile 600 comprises a plurality of features 602. Assume the server computer determines that features 602 should be merged. Simplified map tile 610 comprises feature 604, which is generated by merging the plurality of features 602. In the illustrated example, the feature value for feature 604 is generated by averaging the feature values of features 602. In other embodiments, the feature value for feature 604 may be generated by taking the highest value (e.g. 100) or the lowest value (e.g. 70).

At step 210, the modified map data is stored as a simplified map tile in association with the original map tile. The modified map data does not include electronic map data associated with excluded features. The modified map data may include data associated with merged features, such as combined geometry data and adjusted feature values. Additionally or alternatively, the modified map data may be rendered as a graphical map tile, and the rendered image may be stored in association with the original map tile.

At step 212, a request is received for a particular map tile. The request may be from a client map application on a client computing device or from a server computer that provides a rendered map to a client computing device. For example, server computer 110 may receive a request for a map tile from client map application 104 on client computing device 102.

At step 214, a simplified map tile corresponding to the particular map tile is received. For example, the request may be for a particular map tile in electronic map data 122. The corresponding simplified map tile may be retrieved from simplified electronic map data 124. Additionally or alternatively, a rendered map tile may be generated based on the simplified map tile or a pre-rendered map tile may be retrieved from graphical map tiles 126.

At step 216, the simplified map tile is sent to the client computing device or server computer that requested the particular map tile. Additionally or alternatively, the rendered map tile corresponding to the simplified map tile may be sent to the client computing device or sever computer.

8. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
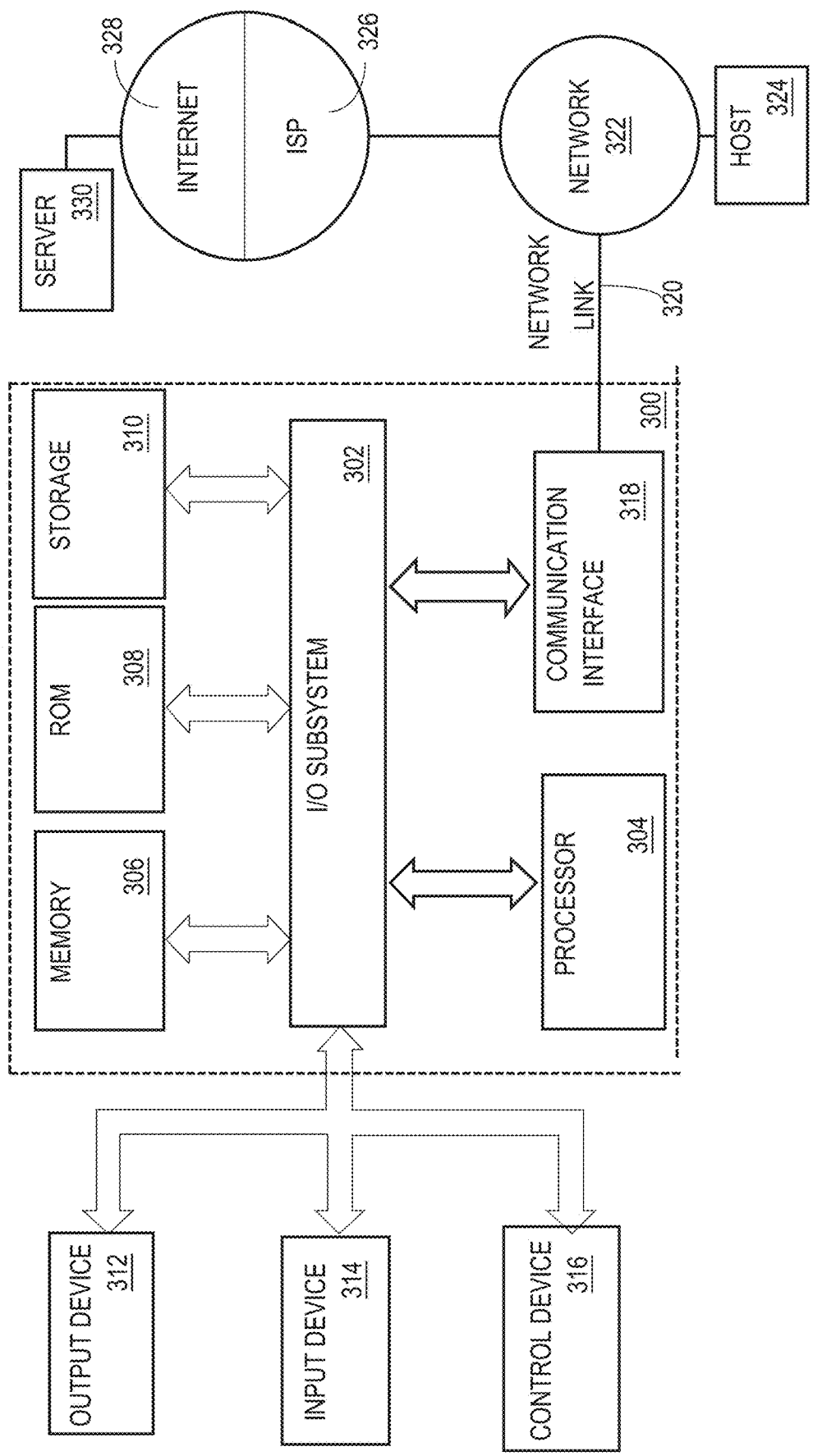
FIG. 3 illustrates a computer system upon which an embodiment may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system for simplifying a digital map for display, comprising:
   one or more memories;
   one or more processors coupled to the one or more memories and configured to execute:
   receiving a digital map for a geographical region, the digital map being organized into a plurality of raw map tiles associated with a plurality of sub-regions of the geographical region;
   retrieving configuration data stored in the one or more memories, the configuration data being related to visibility to humans for simplifying the digital map;
   identifying one or more features from each of the plurality of raw map tiles,
      each feature of the one more features of each of the plurality of raw map tiles corresponding to a cluster of pixels within the raw map tile and having a value for each of the cluster of pixels, at least two features corresponding to a common pixel within a raw map tile of the plurality of raw map tiles;
creating a plurality of modified map tiles forming a modified digital map for the plurality of raw map tiles, a total size of the plurality of modified map tiles being smaller than a total size of the plurality of raw map tiles, by eliminating or merging at least one feature in the plurality of raw map tiles, updating a value of a pixel within a feature in the plurality of raw map tiles, or reducing a size of a feature in the plurality of raw map tiles,
the creating comprising:
computing an aggregate of number of vertices in shapes of features in a raw map tile over a list of neighboring raw map tiles;
selecting a particular raw map tile of the list of neighboring raw map tiles that has a number of vertices in shapes of features within the particular raw map tile that is greater than the aggregate by a particular amount from the configuration data; and
generating a particular modified map tile for the particular raw map tile by reducing the number of vertices in the shapes of the features within the particular raw map tile;
storing, for each of the plurality of modified map tiles, the modified map tile and an indication of a corresponding raw map tile of the plurality of raw map tiles in the one or more memories.

2. The computer system of claim 1, the one or more processors configured to further execute:
receiving a request for a specific raw map tile of the plurality of raw map tiles;
retrieving, from the one or more memories, a specific modified map tile of the plurality of modified map tiles that corresponds to the specific raw map tile;
transmitting the specific modified map tile in response to the request to a display device.

3. The computer system of claim 2, further comprising the display device.

4. The computer system of claim 1,
the configuration data including data for multiple zoom levels for viewing digital maps of the geographical region,
the digital map corresponding to a zoom level of the multiple zoom levels.

5. The computer system of claim 4,
the one or more processors configured to further receive a selection of a particular zoom level of the multiple zoom levels,
the configuration data including smoothing functions allowing dynamic control of simplification of digital maps, as modified digital maps corresponding to successive zoom levels that have been selected are transmitted to a display device.

6. The computer system of claim 1, the creating comprising:
determining that a pixel resolution for a specific raw map tile of the plurality of raw map tiles is below a first threshold from the configuration data;
determining that the specific raw map tile has a specific number of features that is greater than a second threshold from the configuration data;
generating a specific modified map tile for the specific raw map tile by eliminating a feature of the specific number of features.

7. The computer system of claim 1, the creating comprising:
determining that a pixel resolution for a specific raw map tile of the plurality of raw map tiles exceeds a first threshold from the configuration data;
determining that the specific raw map tile has a specific number of features including a feature that is larger than a second threshold from the configuration data;
generating a specific modified map tile for the specific raw map tile by updating at least one value of a pixel in the feature.

8. The computer system of claim 1, the creating comprising generating a specific modified map tile for a set of multiple raw map tiles of the plurality of raw map tiles by assigning a maximum of all values of pixels in features within the set of multiple raw map tiles to at least one pixel of the features within the set of multiple raw map tiles, the at least one pixel each not already having the maximum as a value.

9. The computer system of claim 1, the creating comprising generating a specific modified map tile for a particular raw map tile of the plurality of raw map tiles by assigning a maximum of all values of pixels of certain features of the one or more features associated with the particular raw map tile that correspond to one or more common pixels to at least one pixel of the one or more common pixels of at least one of the certain features, the at least one pixel each not already having the maximum as a value.

10. The computer system of claim 1, each value of a pixel of a feature within the digital map representing an amount of risk that a certain event of a list of events will take place.

11. The computer system of claim 1, a pixel resolution of a particular raw map tile of the plurality of raw map tiles depending on a location of the sub-region associated with the particular raw map tile within the geographical region.

12. One or more non-transitory computer-readable storage media storing instructions which when executed cause one or more processors to perform a method of simplifying a digital map, the method comprising:
receiving, by the one or more processors, a digital map for a geographical region, the digital map being organized into a plurality of raw map tiles associated with a plurality of sub-regions of the geographical region;
retrieving, by the one or more processors, configuration data stored in one or more memories, the configuration data being related to visibility to humans for simplifying the digital map;
identifying one or more features from each of the plurality of raw map tiles,
each feature of the one more features of each of the plurality of raw map tiles corresponding to a cluster of pixels within the raw map tile and having a value for each of the cluster of pixels,
at least two features corresponding to a common pixel within a raw map tile of the plurality of raw map tiles;
creating a plurality of modified map tiles forming a modified digital map for the plurality of raw map tiles, a total size of the plurality of modified map tiles being smaller than a total size of the plurality of raw map tiles, by eliminating or merging at least one feature in the plurality of raw map tiles, updating a value of a pixel within a feature in the plurality of raw map tiles, or reducing a size of a feature in the plurality of raw map tiles, the creating comprising:
  computing an aggregate of number of vertices in shapes of features in a raw map tile over a list of neighboring raw map tiles;
  selecting a particular raw map tile of the list of neighboring raw map tiles that has a number of vertices in shapes of features within the particular raw map tile that is greater than the aggregate by a particular amount from the configuration data; and
  generating a particular modified map tile for the particular raw map tile by reducing the number of vertices in the shapes of the features within the particular raw map tile;
  storing, for each of the plurality of modified map tiles, the modified map tile and an indication of a corresponding raw map tile of the plurality of raw map tiles in the one or more memories.

13. The one or more non-transitory computer-readable storage media of claim 12, the method further comprising:
  receiving a request for a specific raw map tile of the plurality of raw map tiles;
  retrieving, from the one or more memories, a specific modified map tile of the plurality of modified map tiles that corresponds to the specific raw map tile;
  transmitting the specific modified map tile in response to the request to a display device.

14. The one or more non-transitory computer-readable storage media of claim 12,
  the configuration data including data for multiple zoom levels for viewing digital maps of the geographical region,
  the digital map corresponding to a zoom level of the multiple zoom levels.

15. The one or more non-transitory computer-readable storage media of claim 14,
  the one or more processors configured to further receive a selection of a particular zoom level of the multiple zoom levels,
  the configuration data including smoothing functions allowing dynamic control of simplification of digital maps, as modified digital maps corresponding to successive zoom levels that have been selected are transmitted to a display device.

16. The one or more non-transitory computer-readable storage media of claim 12, the creating comprising:
  determining that a pixel resolution for a specific raw map tile of the plurality of raw map tiles is below a first threshold from the configuration data;
  determining that the specific raw map tile has a specific number of features that is greater than a second threshold from the configuration data;
  generating a specific modified map tile for the specific raw map tile by eliminating a feature of the specific number of features.

17. The one or more non-transitory computer-readable storage media of claim 12, the creating comprising:
  determining that a pixel resolution for a specific raw map tile of the plurality of raw map tiles exceeds a first threshold from the configuration data;
  determining that the specific raw map tile has a specific number of features including a feature that is larger than a second threshold from the configuration data;
  generating a specific modified map tile for the specific raw map tile by updating at least one value of a pixel in the feature.

18. The one or more non-transitory computer-readable storage media of claim 12, the creating comprising generating a specific modified map tile for a set of multiple raw map tiles of the plurality of raw map tiles by assigning a maximum of all values of pixels in features within the set of multiple raw map tiles to at least one pixel of the features within the set of multiple raw map tiles, the at least one pixel each not already having the maximum as a value.

19. The one or more non-transitory computer-readable storage media of claim 12, the creating comprising generating a specific modified map tile for a particular raw map tile of the plurality of raw map tiles by assigning a maximum of all values of pixels of certain features of the one or more features associated with the particular raw map tile that correspond to one or more common pixels to at least one pixel of the one or more common pixels of at least one of the certain features, the at least one pixel each not already having the maximum as a value.

20. The one or more non-transitory computer-readable storage media of claim 12, a pixel resolution of a particular raw map tile of the plurality of raw map tiles depending on a location of the sub-region associated with the particular raw map tile within the geographical region.

* * * * *